Oct. 14, 1969   C. W. IVERSON, JR., ET AL   3,472,117
MUSICAL PLAYING AID

Filed March 13, 1967   2 Sheets-Sheet 1

INVENTOR.
Clarence W. Iverson, Jr.
BY Clyde R. Wilson

Attorney

Oct. 14, 1969  C. W. IVERSON, JR., ET AL  3,472,117
MUSICAL PLAYING AID
Filed March 13, 1967  2 Sheets-Sheet 2
"ALWAYS"
Fig. 4
Fig. 5
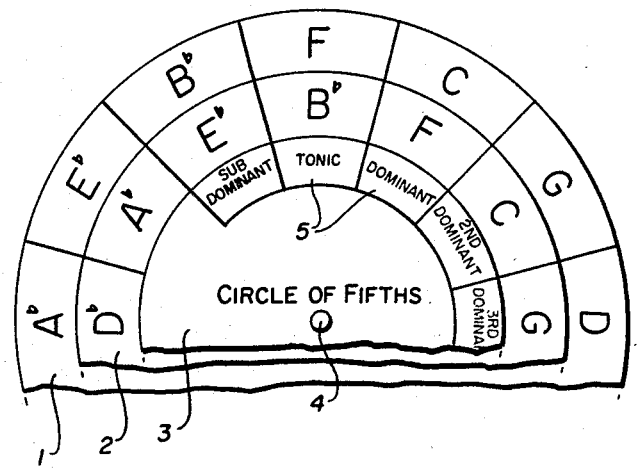
INVENTOR.
Clarence W. Iverson
BY Clyde R. Wilson
Attorney

United States Patent Office 3,472,117,
Patented Oct. 14, 1969

3,472,117
MUSICAL PLAYING AID
Clarence W. Iverson, Jr., 1 Cabrillo St., Oakland, Calif. 94611, and Clyde R. Wilson, 150 Font Blvd., San Francisco, Calif. 94111
Filed Mar. 13, 1967, Ser. No. 622,812
Int. Cl. G09b 15/02
U.S. Cl. 84—474
3 Claims

ABSTRACT OF THE DISCLOSURE

This invention is a device to aid in the playing of various musical instruments for use by accomplished musicians and composers, as well as teachers and students. It comprises essentially three concentric circular discs or slides of different diameters suitably graduated and arranged for relative rotation with respect to one another. By simple manipulation of the slides it is possible by reading the graduations to readily and speedily facilitate the transfer of a musical selection from one key to another through showing at a glance which notes must be struck to produce the melody in its new key and the corresponding new chords which must be used to produce proper harmony. Additionally, the slides show the representation of the proper chords in each case on a musical scale, the corresponding notes on a piano keyboard or on the frets of a guitar or other similar instrument.

BACKGROUND OF THE INVENTION

The field of this invention lies in the basic teaching of music as it has existed for many centuries. It utilizes what is known as the "fifth" or "circle of fifths." The "fifth" in music has been defined as the interval embracing five diatonic degrees and the tone at this interval. It has also been defined as the fifth tone of a scale reckoning up from the "tonic." This system has been well known as far back as the pre-Bach era. It has since been applied in many standard text books and teaching works devoted to music which have included numerous charts for its application.

Numerous devices have been patented as musical teaching or playing aids but none of these rely on the simple basic principle outlined above with one possible exception, and that only to a limited degree, as pointed out below. Examples of these are set forth briefly below.

Patent No. 954,436 to Hunter covers a chart which provides for transposition of music from one key to another, giving the scale of the relative major key and minor key, respective chords and correct fingering on a piano keyboard. It does not provide for ready and instantaneous shifting from one key to another, nor does it display or even employ the circle of fifths.

Patent No. 1,431,972 to Mears provide a device which enables the musician to transpose a musical composition, for example, from the key of C on a piano so that it may may be rendered in the key of say E flat and played on a B flat cornet, for example.

Patent No. 2,649,008 to Bova is a device which facilitates the selecting of chords or denoting the fingering to be used on a guitar or ukulele.

Patent No. 3,129,628 to Hall covers a device for use in rapid demonstration of what keys on a piano keyboard correspond to what notes on a given musical scale as an aid to teaching.

Patent No. 2,542,235 to Clopton utilizes the circle of fifths, as do the inventors herein, but in an entirely different manner and their device does not perform the same function as ours, as will be evident from the description below. Principally it requires the use of numerous windows and several different settings in order to be able to determine the proper shift in chords in going from one key to another which is unnecessary in the case of our invention.

SUMMARY

The essential elements of our invention comprise two graduated dials arranged to move in relation to one another as in a rotary or straight slide-rule. Both dials are identical and are graduated in the letters comprising the circle of fifths mentioned above. When transposing from one musical scale to another, the letter denoting the new scale or key is placed beneath the letter denoting the old key and then under each of the letters of the old key may be read the corresponding letter of the new key. This applies equally to musical notes, as well as to harmony chords.

The user of this device has before him at all times the entire circle of fifths, both for the old key and the new key, thus enabling him to readily select the proper harmonic changes. In addition there is included a third disc which aids the ear in the selection of the proper chords to be used when harmonizing a tune by ear. A better understanding may be had by reference to the drawings and description which follows.

BRIEF DESCRIPTION OF THE DRAWINGS

In the drawings:
FIG. 4 represents several bars of the song "Always.
"
FIG. 5 illustrates the use of our invention in transposing keys in the song of FIG. 4.

DESCRIPTION OF THE PREFERRED EMBODIMENTS

Figure 1:
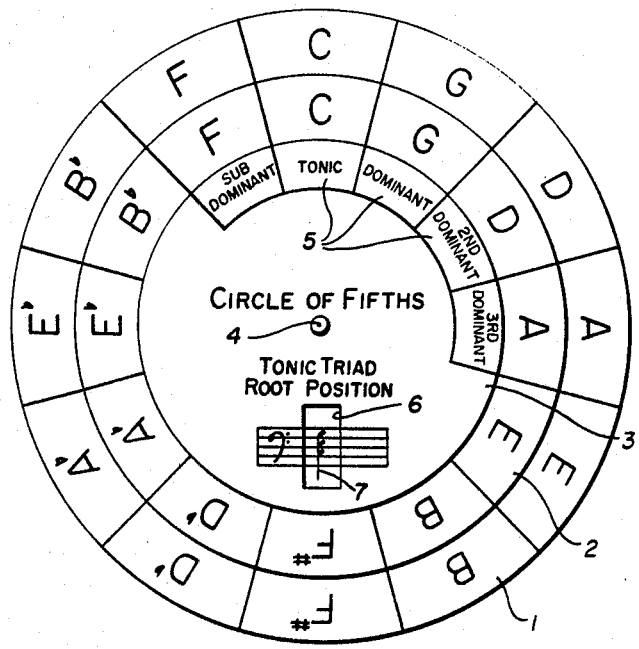
FIG. 1 represents a front or plan view of the device of our invention.
Figure 2:
FIG. 2 represents the end view of FIG. 1.

The outer dial or disc 1 is divided into radial segments by means of suitable markings as shown and carries the graduations representing each letter of the circle of fifths, as described above, in each segment. The intermediate dial or disc 2 is of smaller diameter than disc 1 and also carries around its periphery the graduations of the circle of fifths. We may also employ a central disc 3 carrying suitable graduations and performing an additional combined useful function as set forth below. The discs described above may be made of cardboard, light metal, plastic, or other suitable material known in the art. They are mounted concentrically and arranged for relative rotation by means of a central pivot or pin 4. This may be a rivet or bolt or any other similar device. The central disc 3 carries on part of its outer periphery radial segments containing graduations labeled "sub-dominant," "tonic," "dominant," "second dominant," and "third dominant." These are indicated collectively at 5 on the drawings. There is also a window 6 cut through the central disc 3 so as to expose the upper surface of intermediate disc 2 located below it. On this upper surface of disc 2 there are drawn in the form of an arc the representation of chords as they appear on the musical scale in such a manner that when the graduation "tonic" is placed adjacent to a given letter on intermediate disc 2, the corresponding representation of the chord is seen through the window 6 as shown at 7. Thus in FIG. 1 as shown if the key is C, the "tonic" chord appears as shown at 7.

Instead of the representation of the chord on a musical scale we may provide a reproduction of a keyboard indicating which keys must be struck to produce any given chord or we may indicate diagrammatically for each respective chord the method of fingering the frets on a guitar or other similar instrument.

Figure 3:
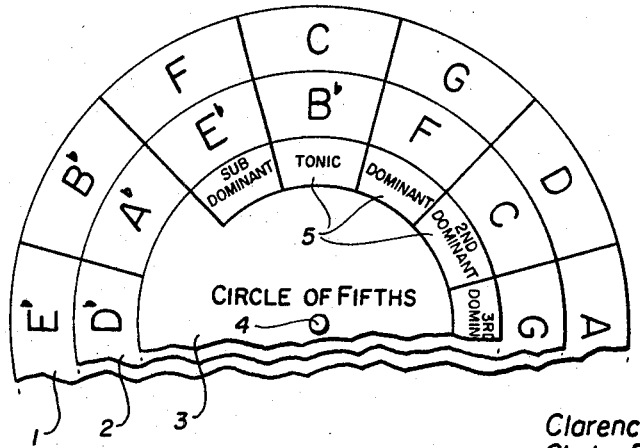
FIG. 3 represents a partial front or plan view showing the principle of operation of our invention.

The operation of our invention may be best seen by reference to FIG. 3. The present or old key in which the music is being played is represented by the graduations on the outer disc 1. The desired or new key in which the music is to be played is represented by the graduations on the intermediate disc 2. In the example shown, the music is written in the key of C and it is desired to play this in the key of B flat. Disc 2 is rotated so that B flat appears directly under C. The new notes and chords are then read on disc 2 opposite the corresponding ones on disc 1. Thus where note G had previously appeared, note F will now be played and where D previously appeared, note C will be played. The same applies to the harmony chords to be used.

If now this disc is rotated so that the graduation "tonic" appears under B flat on disc 2, the repersentation of this chord, namely B flat, will appear through window 6 at 7 as described previously. Or in the alternative, there would appear a reproduction of this chord on a keyboard or fretted instrument.

The movement from one chord to another and maintaining a proper harmony while playing the melody, is guided by the principle of the circle of fifths mentioned above, which is done by reference to the circle as it appears on our device which the musician has in front of him. It is thus unnecessary for him to utilize any other or more complicated devices or refer to other charts since our invention provides all the necessary information immediately at one glance.

Referring now to FIG. 4 there is seen an illustration of a practical application of our invention to a given song. Represented on FIG. 4 are several bars of the composition "Always" by Irving Berlin written in the key of F. This melody changes musical keys a number of times, though starting with the key of F. The proper harmonic chords are indicated on the figure as F, C, F, A, E, A, and C again successively for the bars shown. Now, if one wants to transpose the basic keys of the music shown on FIG. 4 from the key of F to the key of B flat, this may be readily accomplished by the use of our invention as shown on FIG. 5. In this case disc 2 is rotated so that B flat appears directly under F. The new chords for the bars of "Always" are then readily read from our device as being B flat, F, B flat, D, A, D, and F respectively.

No other devices or complicated charts or mechanisms are needed but the information necessary to properly transpose in the new key is given instantaneously and at a single glance when the device is positioned in front of the musician. The tremendous advantages of this invention should now be apparent to those skilled in the art.

We have shown a circular arrangement of our device as represented by parts 1, 2, and 3. Other embodiments should now be evident to those skilled in the art. For example, we may use the same type of graduations arranged on straight lines employing parallel slides, as is done with an ordinary slide rule.

Other modifications and embodiments will also be evident to those skilled in the art and we do not limit ourselves to those shown here.

We claim:
1. An apparatus for facilitating the playing of music comprising:
   a first circular disc having graduations corresponding to the letters of a musical circle of fifths around its periphery;
   a second circular disc having a small diameter than said first disc and having the identical graduations around its periphery;
   said second disc being concentrically positioned above said first disc;
   all of said graduations on both of said discs being visible at all times;
   said discs being rotatably mounted with respect to one another by a central pivot means;
   a third disc concentrically positioned above said second disc and rotably mounted with respect to said second disc by a central pivot means;
   said third disc having graduations around its periphery denoting successively the chord positions sub-dominant, tonic, dominant, second dominant, and third dominant of a musical circle of fifths;
   said third disc having an opening there-through communicating with the upper surface of said second disc;
   said upper surface of said second disc having graduated upon it the musical scale representations of each of the chords of said circle of fifths;
   said representations being so positioned on the surface of said second disc that when the chord position tonic is in register with a given letter graduation on said second disc the representations of the chord of said letter appears through said opening in said third disc.

2. The apparatus of claim 1 in which said upper surface of said second disc has graduated upon it representations of a piano keyboard representing the proper keys for each of the chords of said circle of fifths.

3. The apparatus of claim 1 in which said upper surface of said second disc has graduated upon it diagrammatic representations of the proper frets required for each of the chords of said circle of fifths on a fretted instrument.

References Cited

UNITED STATES PATENTS

| | | | |
|---|---|---|---|
| 2,542,235 | 2/1951 | Clopton | 84—474 |
| 801,538 | 10/1905 | Milton | 84—474 |
| 1,431,972 | 10/1922 | Mears | 84—474 |
| 2,808,206 | 10/1957 | Rodriquez | 235—88 |
| 3,013,720 | 12/1961 | Steinkoenig | 235—78 |

FOREIGN PATENTS 7,219    3/1913    Great Britain.

RICHARD B. WILKINSON, Primary Examiner

L. R. FRANKLIN, Assistant Examiner

U.S. Cl. X.R.

235—78